United States Patent
Wang et al.

(10) Patent No.: US 10,296,799 B2
(45) Date of Patent: *May 21, 2019

(54) EXTRACTING CARD IDENTIFICATION DATA

(71) Applicant: GOOGLE LLC, Mountain View, CA (US)

(72) Inventors: Xiaohang Wang, Jersey City, NJ (US); Justin Scheiner, Oceanside, NY (US); Glenn Berntson, Jersey City, NJ (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/877,366

(22) Filed: Jan. 22, 2018

(65) Prior Publication Data

US 2018/0144205 A1    May 24, 2018

Related U.S. Application Data

(63) Continuation of application No. 15/267,117, filed on Sep. 15, 2016, now Pat. No. 9,886,641, which is a
(Continued)

(51) Int. Cl.
*G06K 9/18* (2006.01)
*G06K 7/14* (2006.01)
(Continued)

(52) U.S. Cl.
CPC ............ *G06K 9/18* (2013.01); *G06K 7/1447* (2013.01); *G06K 9/00442* (2013.01);
(Continued)

(58) Field of Classification Search
CPC ............ G06K 7/10; G06K 9/18; G06K 19/00; G06K 5/00; G06F 17/00; G07B 15/02
(Continued)

(56) References Cited

U.S. PATENT DOCUMENTS 5,357,563 A   10/1994   Hamilton et al.
7,861,934 B1   1/2011   Williams et al.
(Continued)

OTHER PUBLICATIONS

Labaze, "U.S. Office Action issued in copending U.S. Appl. No. 14/550,871, filed Nov. 21, 2014", dated Jul. 1, 2015, 7 pages.
(Continued)

*Primary Examiner* — Edwyn Labaze
(74) *Attorney, Agent, or Firm* — Johnson, Marcou & Isaacs, LLC

(57) ABSTRACT

Extracting card information comprises a server at an optical character recognition ("OCR") system that interprets data from a card. The OCR system performs an optical character recognition algorithm an image of a card and performs a data recognition algorithm on a machine-readable code on the image of the card. The OCR system compares a series of extracted alphanumeric characters obtained via the optical character recognition process to data extracted from the machine-readable code via the data recognition process and matches the alphanumeric series of characters to a particular series of characters extracted from the machine-readable code. The OCR system determines if the alphanumeric series and the matching series of characters extracted from the machine-readable code comprise any discrepancies and corrects the alphanumeric series of characters based on the particular series of characters extracted from the machine-readable code upon a determination that a discrepancy exists.

20 Claims, 9 Drawing Sheets

Related U.S. Application Data continuation of application No. 14/550,871, filed on Nov. 21, 2014, now Pat. No. 9,460,358.

(60) Provisional application No. 62/024,830, filed on Jul. 15, 2014.

(51) Int. Cl.
    *G06K 9/00* (2006.01)
    *G06K 9/03* (2006.01)
    *G06K 9/34* (2006.01)
    *G06K 9/62* (2006.01)
    *G06K 9/20* (2006.01)
    *G06K 9/72* (2006.01)

(52) U.S. Cl.
    CPC ............ *G06K 9/036* (2013.01); *G06K 9/2054* (2013.01); *G06K 9/344* (2013.01); *G06K 9/62* (2013.01); *G06K 9/6255* (2013.01); *G06K 9/726* (2013.01); *G06K 2209/01* (2013.01)

(58) Field of Classification Search
    USPC ..... 235/462.01, 375, 487, 462.09, 380, 382, 235/494
    See application file for complete search history.

(56) References Cited

U.S. PATENT DOCUMENTS

| | | | |
|---|---|---|---|
| 9,111,402 | B1 | 8/2015 | Krishnan et al. |
| 9,460,358 | B2 | 10/2016 | Wang et al. |
| 2002/0130185 | A1 | 9/2002 | LaForge et al. |
| 2003/0178487 | A1 | 9/2003 | Rogers |
| 2006/0045374 | A1 | 3/2006 | Kim et al. |
| 2006/0176524 | A1 | 8/2006 | Willrich |
| 2008/0185438 | A1 | 8/2008 | Pinchen et al. |
| 2010/0150448 | A1 | 6/2010 | Lecerf et al. |
| 2012/0234911 | A1 | 9/2012 | Yankovich et al. |
| 2012/0292388 | A1 | 11/2012 | Hernandez |
| 2013/0037607 | A1 | 2/2013 | Bullwinkel |
| 2013/0151401 | A1 | 6/2013 | Scipioni et al. |
| 2014/0076965 | A1 | 3/2014 | Becorest et al. |
| 2014/0143143 | A1 | 5/2014 | Fasoli et al. |
| 2014/0198969 | A1 | 7/2014 | McRae |
| 2014/0263654 | A1 | 9/2014 | Davis et al. |
| 2014/0279516 | A1 | 9/2014 | Rellas et al. |
| 2015/0341370 | A1* | 11/2015 | Khan ................... H04L 63/20 726/30 |
| 2016/0019431 | A1 | 1/2016 | Wang et al. |
| 2016/0019439 | A1 | 1/2016 | Wang et al. |
| 2016/0239733 | A1* | 8/2016 | Hertz ............... G06F 17/30887 |
| 2017/0004370 | A1 | 1/2017 | Wang et al. |

OTHER PUBLICATIONS

Labaze, "U.S. Office Action issued in copending U.S. Appl. No. 14/550,871, filed Nov. 21, 2014", dated Feb. 19, 2016, 8 pages.
Labaze, "U.S. Office Action issued in copending U.S. Appl. No. 15/267,117, filed Sep. 15, 2016", dated Apr. 19, 2017, 10 pages.
Labaze, "U.S. Office Action issued in copending U.S. Appl. No. 15/267,117, filed Sep. 15, 2016", dated Oct. 6, 2016, 10 pages.
Mai, "U.S. Office Action issued in copending U.S. Appl. No. 14/550,878, filed Nov. 21, 2014", dated Jun. 1, 2017, 10 pages.
Mai, "U.S. Office Action issued in copending U.S. Appl. No. 14/550,878, filed Nov. 21, 2014", dated Oct. 11, 2016, 11 pages.
Mai, "U.S. Office Action issued in copending U.S. Appl. No. 14/550,878, filed Nov. 21, 2014", dated Aug. 17, 2015, 7 pages.
Mai, "U.S. Office Action issued in copending U.S. Appl. No. 14/550,878, filed Nov. 21, 2014", dated May 19, 2016, 7 pages.
Mai, "U.S. Office Action issued in copending U.S. Appl. No. 14/550,878, filed Nov. 21, 2014", dated Jan. 27, 2016, 9 pages.
Mai, "U.S. Office Action issued in copending U.S. Appl. No. 14/550,878, filed Nov. 21, 2014", dated Sep. 11, 2017, 11 pages.
U.S. Appl. No. 14/550,871 to Wang et al. filed Nov. 21, 2014.
U.S. Appl. No. 15/267,117 to Wang et al. filed Sep. 15, 2016.
U.S. Appl. No. 14/550,878 to Wang et al. filed Nov. 21, 2014.
Mai, "U.S. Office Action issued in copending U.S. Appl. No. 14/550,878, filed Nov. 21, 2014", dated May 16, 2018, 12 pages.

* cited by examiner

EXTRACTING CARD IDENTIFICATION DATA

CROSS REFERENCE TO RELATED APPLICATIONS

This application is a continuation of and claims priority to U.S. patent application Ser. No. 15/267,177 filed Sep. 15, 2016 and entitled "Extracting Card Identification Data," which is a continuation of U.S. patent application Ser. No. 14/550,871, filed Nov. 21, 2014, and entitled "Extracting Card Identification Data," which claims priority to U.S. Patent Application No. 62/024,830 filed Jul. 15, 2014 and entitled "Extracting Card Identification Data." The entire disclosure of each of the above-identified priority applications is hereby fully incorporated herein by reference.

TECHNICAL FIELD

The technology disclosed herein pertains to extracting card information, and more particularly to using card data, barcode data, and adaptive metadata models to improve the extraction process.

BACKGROUND

When consumers make online purchases or purchases using mobile devices, they are often forced to enter card information into the mobile device for payment. Due to the small screen size and keyboard interface on a mobile device, such entry is generally cumbersome and prone to errors. Users may use many different cards for purchases, such as gift cards, debit cards, credit cards, stored value cards, and other cards. Information entry difficulties are multiplied for a merchant attempting to process mobile payments on mobile devices for multiple transactions.

Current applications for obtaining payment information from a payment card require a precise positioning of the card in the scan. Typically, a box is presented on the user interface of the user computing device. The user is required to precisely line the card up within the box to allow the user computing device to recognize the card.

Even with proper techniques, current optical character recognition processes, systems, and algorithms, are occasionally prone to extracting incorrect data from the card images. Current applications do not utilize other available data, such as barcode data to improve the extraction process.

SUMMARY

Techniques herein provide a computer-implemented method to extract card information from a digital image of a card. In an example embodiment, an optical character recognition ("OCR") system performs an optical character recognition algorithm on an image of a card and performs a data recognition algorithm on a machine-readable code on the image of the card. The OCR system compares a series of extracted alphanumeric characters obtained via the optical character recognition process to data extracted from the machine-readable code via the data recognition process and matches the alphanumeric series of characters to a particular series of characters extracted from the machine-readable code. The OCR system determines if the alphanumeric series and the matching series of characters extracted from the machine-readable code comprise any discrepancies and corrects the alphanumeric series of characters based on the particular series of characters extracted from the machine-readable code upon a determination that a discrepancy exists. The OCR system may also determine a card type and use a card format associated with the card type to improve the data extraction.

In certain other example aspects described herein, a system and a computer program product to extract account information from a card are provided.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
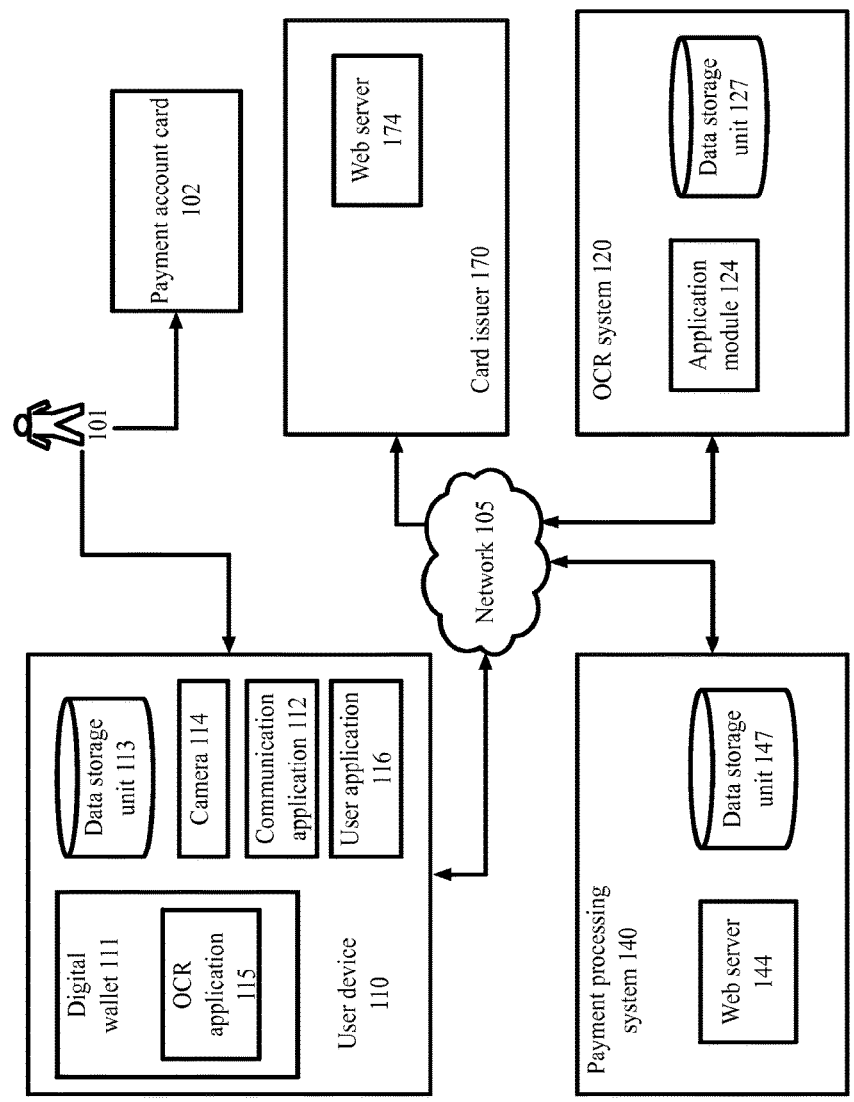
FIG. 1 is a block diagram depicting a system for extracting account information from a card, in accordance with certain example embodiments of the technology disclosed herein.

Embodiments herein provide computer-implemented techniques for allowing a user computing device to extract card information using optical character recognition ("OCR"). Throughout the specification, the general term "card" will be used to represent any type of physical card instrument, such as a magnetic stripe card. In example embodiments, the different types of card represented by "card" can include credit cards, debit cards, stored value cards, loyalty cards, identification cards, or any other suitable card representing an account or other record of a user or other information thereon. Example embodiments described herein may be applied to the images of other items, such as receipts, boarding passes, tickets, and other suitable items. The card may also be an image or facsimile of the card. For example, the card may be a representation of a card on a display screen or a printed image of a card.

The user may employ the card when making a transaction, such as a purchase, ticketed entry, loyalty check-in, or other suitable transaction. The user may obtain the card information for the purpose of importing the account represented by the card into a digital wallet application module of a computing device or for other digital account purposes. The card is typically a plastic card containing the redemption code, account information, and other data. In certain card embodiments, the customer name, expiration date, and card numbers are physically embossed or otherwise written on the card. The embossed information is visible from both the front and back of the card, although the embossed information is typically reversed on the back of the card.

A user may desire to enter the information from the card into a mobile user computing device or other computing device, for example, to conduct an online purchase, to conduct a purchase at a merchant location, to add the information to a wallet application on a user computing device, or for any other suitable reason. In an example, the user desires to use a mobile computing device to conduct a purchase transaction using a digital wallet application module executing on the mobile computing device. The digital wallet application module may require an input of the details of a particular gift card or other user payment account to conduct a transaction with the particular user payment account or to set up the account. Due to the small screen size and keyboard interface on a mobile device, such entry can be cumbersome and error prone for manual input. Additionally, a merchant system may need to capture card information to conduct a transaction or for other reasons.

In addition to account identifiers, the front of the card typically contains logos of the issuer of the card, pictures chosen by the user or the issuer, other text describing the type or status of the user account, redemption rules, a security code, and other marketing and security elements, such as holograms or badges. The name, card expiration date, and the account identifier, such as a credit card number, may be embossed on the front of the card such that the information protrudes from the front of the card.

The user employs a mobile phone, digital camera, or other user computing device to capture an image of the card associated with the account that the user desires to input into the user computing device. An OCR application receives the image of the card from the camera. The OCR application communicates the image to the OCR system. The OCR system isolates the image of the card. The OCR system can use any image data manipulation or image extraction to isolate the card image. The OCR system may crop out a portion of the image to display only the desired information from the card.

The OCR system extracts relevant data from the card. The extraction may be performed with an OCR algorithm, image recognition, or any suitable manipulation or analysis of the image. The OCR system may extract the human-readable identifier, the user name, a merchant name, legal terms for redemption or usage, images, logos, or any other suitable information or data from the card. In particular, the OCR system identifies a likely human-readable identifier and a machine-readable identifier, such as a barcode. The human-readable identifier may be a series of alphanumeric characters that form a redemption code, an account identifier, or any suitable identifier. The barcode may include a redemption code, an account identifier, and/or any suitable identifier, in addition to other data.

The OCR system compares the extracted alphanumeric characters to the extracted barcode data to verify or correct the characters. The identifier of the card, such as a redemption code or an account identifier, is typically represented on the card as an alphanumeric character series and in the barcode. Data extracted from a barcode is typically more accurate than data extracted from alphanumeric characters.

In an example, a 16 digit redemption code for a gift card may be extracted and compared to a 30 digit code extracted from a barcode. The OCR system may employ a matching algorithm to identify a 16 digit series embedded in the 30 digit code from the barcode that matches the redemption code.

If the 16 digit series in the barcode matches the 16 digit alphanumeric character series, then the redemption code of the example is verified as accurate. In certain examples, the digits are not an exact match. In an example, 14 of the digits match, but 2 of the digits are different. If one or more of the digits do not match, the barcode digits are assumed to be correct and the alphanumeric characters are corrected accordingly.

In another embodiment, the OCR system uses text extracted from the card image to train and retrain card metadata models. The OCR system may sort card data that may be used to identify a card type or a particular merchant system associated with the card. Card data that may be used to identify a card type might include a merchant name, an issuer name, a phone number, a website address, an address, a logo, or any other suitable data. In certain embodiments, other data extracted from the card image may be used, such as pictures, logos, or other suitable data.

When the OCR system extracts data from a subsequent card image, the extracted data is compared to the metadata model database. The data from the card image is classified based on matches between the extracted data and the metadata models. For example, if the extracted data comprises a specific merchant system name, then the model with that name may be identified as an appropriate model for the card. Metadata for the card type associated with the merchant system may be provided to the OCR system. For example, the OCR system may extract, from the model, a merchant system address or a merchant system website address.

The metadata may be used to autofill a form that is being used to add the card to the digital wallet application module of the user. Autofilling a form includes any process or method to populate data entry requirements on a form or other online document with expected entries based on stored or supplied information without requiring an input from a user.

In certain examples, the user corrects the autofilled data. In an example, the data that was inserted into a data field of the form is either incorrect or not the preferred entry for the user. In the example, the user manually alters the data in the incorrect field. The user saves the corrected data and registers the card or performs any other suitable action with the card data.

The OCR system logs the correction by the user. Periodically or continually, the OCR system analyzes the logged corrections. If the number of corrections to a data field surpasses a threshold, then the OCR system retrains the metadata model. An example threshold may be twenty users.

In an example, the OCR system determines that twenty users have changed the phone number for a merchant system associated with a card from the stored number to an alternate number. The OCR system determines that either the previous number was incorrect or that the merchant system has changed the phone number. The OCR system updates the metadata model associated with the merchant system to reflect the changed model. The OCR system may provide the updated phone number to subsequent users to determine if the number is accepted by the users. Alternatively, an operator of the OCR system verifies the data independently. If verified, then the OCR system updates the model to reflect the new phone number and provides the new phone number to subsequent users.

In another example, the data extracted by the OCR system from a card image is used to identify the card type and the identity of the merchant system. The text may be identified in the database as the name for a particular bank, merchant system, card issuer, or any suitable institution. For example, the OCR system may identify text on the card image that matches a name of a merchant system in the database. In an example, the OCR system may identify the card image as likely being a debit card associated with the particular merchant system.

When the merchant system of the example is identified, the OCR system determines the format of the card associated with the merchant system. The known format of a card allows the data extraction to be performed more accurately. For example, if the OCR system determines that the card has a format wherein a redemption code is a 16 digit code at the end of the string of characters represented on the barcode, then the OCR system will be able to easily and accurately extract the redemption code. In another example, the OCR system may access a Checksum rule for the account number on a card. If the OCR system extracts the account number, the OCR system may then apply the appropriate Checksum algorithm to verify the account number.

In other embodiments, the OCR system may be customized to look for characters in particular locations on the card image based on the card type. The OCR system may be customized to look for a certain number of characters. The OCR system may be customized to look for certain combinations of characters. The OCR system may be customized to know that the cards from the particular credit card company typically have certain data on the reverse side of the card. The OCR system may be customized to know which characters are typically embossed. The OCR system may be customized to look for any configured arrangements, data locations, limitations, card types, character configurations, or other suitable card data.

Example System Architecture

Turning now to the drawings, in which like numerals represent like (but not necessarily identical) elements throughout the figures, example embodiments are described in detail.

FIG. 1 is a block diagram depicting a system for extracting financial account information from a card, in accordance with certain example embodiments. As depicted in FIG. 1, the system 100 includes network computing systems 110, 120, 140, and 170 that are configured to communicate with one another via one or more networks 105. In some embodiments, a user associated with a device must install an application and/or make a feature selection to obtain the benefits of the techniques described herein.

Each network 105 includes a wired or wireless telecommunication means by which network devices (including devices 110, 124, 140, and 170) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network computing system 110, 120, 140, and 170 includes a device having a communication module capable of transmitting and receiving data over the network 105. For example, each network device 110, 124, 140, and 170 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 124, 140, and 170 are operated by end-users or consumers, OCR system operators, payment processing system operators, and card issuer operators, respectively.

The user 101 can use the communication application 112, which may be, for example, a web browser application or a stand-alone application, to view, download, upload, or otherwise access documents or web pages via a distributed network 105. The network 105 includes a wired or wireless telecommunication system or device by which network devices (including devices 110, 124, 140, and 170) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages.

The user device 110 may employ a communication module 112 to communicate with the OCR system application module 124 of the OCR system 120 or other servers. The communication module 112 may allow devices to communicate via technologies other than the network 105. Examples might include a cellular network, radio network, or other communication network.

The user computing device 110 may include a digital wallet application module 111. The digital wallet application module 111 may encompass any application, hardware, software, or process the user device 110 may employ to assist the user 101 in completing a purchase. The digital wallet application module 111 can interact with the communication application 112 or can be embodied as a companion application of the communication application 112. As a companion application, the digital wallet application module 111 executes within the communication application 112. That is, the digital wallet application module 111 may be an application program embedded in the communication application 112.

The user device 110 may include an optical character recognition ("OCR") application 115. The OCR application 115 may interact with the communication application 112 or be embodied as a companion application of the communication application 112 and execute within the communication application 112. In an exemplary embodiment, the OCR application 115 may additionally or alternatively be embodied as a companion application of the digital wallet application module 111 and execute within the digital wallet application module 111. The OCR application 115 may employ a software interface that may open in the digital wallet application 111 or may open in the communication application 112. The interface can allow the user 101 to configure the OCR application 115.

The OCR application 115 may be used to analyze a card and extract information or other data from the card. The OCR system 120 or other system that develops the OCR algorithms or other methods may include a set of computer-readable program instructions, for example, using JavaScript, that enable the OCR system 120 to interact with the OCR application 115.

Any of the functions described in the specification as being performed by the OCR application 115 can be performed by the payment processing system 140, the OCR system application module 124, the user computing device 110, the digital wallet application module 111, a merchant system (not pictured) or any other suitable hardware or software system or application. In an example, the OCR application 115 on the user computing device 110 may obtain an image of a card 102 and transmit the image to the OCR system application module 124 to extract the information on the card 102.

The user device 110 includes a data storage unit 113 accessible by the OCR application 115, the web browser application 112, or any suitable computing device or application. The exemplary data storage unit 113 can include one or more tangible computer-readable media. The data storage unit 113 can be stored on the user device 110 or can be logically coupled to the user device 110. For example, the data storage unit 113 can include on-board flash memory and/or one or more removable memory cards or removable flash memory.

The user device 110 may include a camera 114. The camera may be any module or function of the user computing device 110 that obtains a digital image. The camera 114 may be onboard the user computing device 110 or in any manner logically connected to the user computing device 110. The camera 114 may be capable of obtaining individual images or a video scan. Any other suitable image capturing device may be represented by the camera 114.

The user device 110 may include user applications 116. The user applications 116 may be contact applications, email applications, digital wallet applications, or any applications that may employ the name of the user and/or names of acquaintances of the user. The user may provide permission to the OCR application 115 to access the names and other data from the user applications 116. The OCR application 115 may use the data from the user applications 116 to verify or improve the OCR process.

The payment processing system 140 includes a data storage unit 147 accessible by the web server 144. The example data storage unit 147 can include one or more tangible computer-readable storage devices. The payment processing system 140 is operable to conduct payments between a user 101 and a merchant system (not pictured). The payment processing system 140 is further operable to manage a payment account of a user 101, maintain a database to store transactions of the merchant system and the user 101, verify transactions, and other suitable functions.

The user 101 may use a web server 144 on the payment processing system 140 to view, register, download, upload, or otherwise access the payment processing system 140 via a website (not illustrated) and a communication network 105. The user 101 associates one or more registered financial card accounts, including bank account debit cards, credit cards, gift cards, loyalty cards, coupons, offers, prepaid offers, store rewards cards, or other type of financial account that can be used to make a purchase or redeem value-added services with a payment account of the user 101.

A card issuer, such as a bank or other institution, may be the issuer of the financial account being registered. For example, the card issuer may be a gift card issuer, credit card issuer, a debit card issuer, a stored value issuer, a financial institution providing an account, or any other provider of a financial account. The payment processing system 140 also may function as the issuer for the associated financial account. The user's registration information is saved in the payment processing system's 140 data storage unit 147 and is accessible the by web server 144. The card issuer employs a card issuer system 170 to issue the cards, manage the user account, and perform any other suitable functions. The card issuer system 170 may alternatively issue cards used for identification, access, verification, ticketing, or cards for any suitable purpose.

The OCR system 120 utilizes an OCR system application module 124 operating a system that produces, manages, stores, or maintains OCR algorithms, methods, processes, or services. The OCR system application module 124 may represent the computer-implemented system that the OCR system 120 employs to provide OCR services to user computing devices 110, merchant computing systems, or any suitable entity. The OCR system application module 124 can communicate with one or more payment processing systems 140, a user computing device 110, or other computing devices via any available technologies. Such technologies may include, for example, an Internet connection via the network 105, email, text, instant messaging, or other suitable communication technologies. The OCR system 120 may include a data storage unit 127 accessible by the OCR system application module 124 of the OCR system 120. The data storage unit 127 can include one or more tangible computer-readable storage devices.

Any of the functions described in the specification as being performed by the OCR system 120 can be performed by the OCR application 115, the user computing device 110, or any other suitable hardware or software system or application.

Throughout the specification, the general term "card" will be used to represent any type of physical card instrument, such as the payment account card 102. In example embodiments, the different types of card 102 represented by "card" 102 can include credit cards, debit cards, stored value cards (such as "gift" cards), loyalty cards, identification cards, or any other suitable card representing an account of a user 101 or other information thereon.

The user 101 may employ the card 102 when making a transaction, such as a purchase, ticketed entry, loyalty check-in, or other suitable transaction. The user 101 may obtain the card information for the purpose of importing the account represented by the card 102 into a digital wallet application module 111 of a computing device 110 or for other digital account purposes. The card 102 is typically a plastic card containing the account information and other data on the card 102. In many card 102 embodiments, the customer name, expiration date, and card numbers are physically embossed on the card 102. The embossed information is visible from both the front and back of the card 102, although the embossed information is typically reversed on the back of the card 102.

It will be appreciated that the network connections shown are exemplary and other means of establishing a communications link between the computers and devices can be used. Moreover, those having ordinary skill in the art having the benefit of the present disclosure will appreciate that the user device 110, OCR system 120, payment processing system 140, and card issuer system 170 illustrated in FIG. 1 can have any of several other suitable computer system configurations. For example, a user device 110 embodied as a mobile phone or handheld computer may not include all the components described above.

Example Processes

The example methods illustrated in FIGS. 2-5 and FIG. 7-8 are described hereinafter with respect to the components of the example operating environment 100. The example methods of FIGS. 2-5 and FIG. 7-8 may also be performed with other systems and in other environments.

Figure 2:
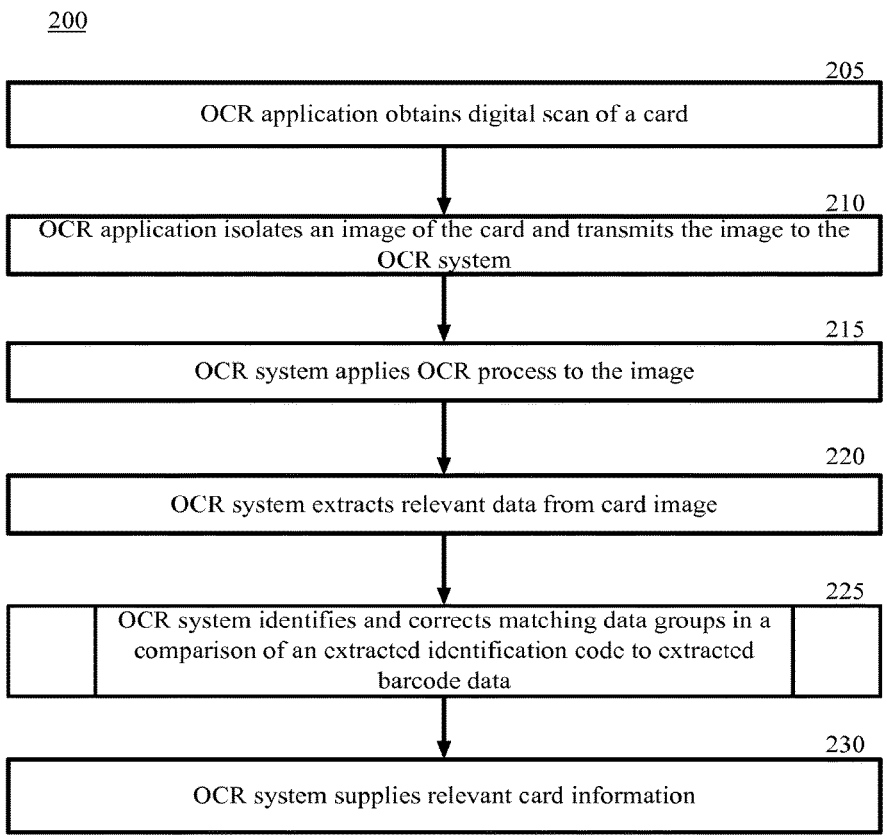
FIG. 2 is a block flow diagram depicting methods for extracting account information using a comparison with barcode data, in accordance with certain example embodiments.

FIG. 2 is a block flow diagram depicting a method 200 for extracting account information using a comparison with barcode data, in accordance with certain exemplary embodiments.

With reference to FIGS. 1 and 2, in block 205, the optical character recognition ("OCR") application 115 on the user device 110 obtains a digital scan or image of a card 102. The user 101 employs a mobile phone, digital camera, or other user computing device 110 to capture an image of the card 102 associated with the account that the user 101 desires to input into the user computing device 110.

An OCR application 115 on a user computing device 110 obtains the image of the card 102. The image may be obtained from the camera module of a user computing device 110, such as the camera 114 on a mobile phone. The image may be obtained from a scanner coupled to the user computing device 110 or any other suitable digital imaging device. The image may be obtained from video captured by the user computing device 110. The image may be accessed by the OCR application 115 on the user computing device 110 from a storage location 113 on the user computing device 110, from a remote storage location, or from any suitable location. All sources capable of providing the image will be referred to herein as a "camera" 114. In an example embodiment, an image of the front of the card 120, an image of the reverse of the card 120, or one or more images of the front and/or reverse of the card 120 are obtained.

An OCR system application module 124 receives the image of the card from the camera 114. The functions of the OCR application 115 and the OCR system 120 may be performed by any suitable module, hardware, software, or application operating on the user computing device 110, the OCR system application module 124 or another computing device. Some, or all, of the functions of the OCR application 115 may be performed by a remote server or other computing device, such as the OCR system application module 124. For example, a digital wallet application module 111 on the user computing device 110 may obtain the image of the card and transmit the image to the OCR system application module 124 for processing. In another example, some of the OCR functions may be conducted by the user computing device 110 and some by the OCR system application module 124 or another remote server. Examples provided herein may indicate that many of the functions are performed by an OCR system application module 124, but some or all of the functions may be performed by any suitable computing device.

In an example, the image is presented on the user interface of the user computing device 110 as a live video image of the card 102 or a single image of the card 102. The OCR application 115 can isolate and store one or more images from the video feed of the camera 114. For example, the user 101 may hover the camera 114 function of a user computing device 110 over a card and observe the representation of the card on the user interface of the user computing device 110. An illustration of the card 102 displayed on the user computing device is presented in FIG. 6.

Figure 6:
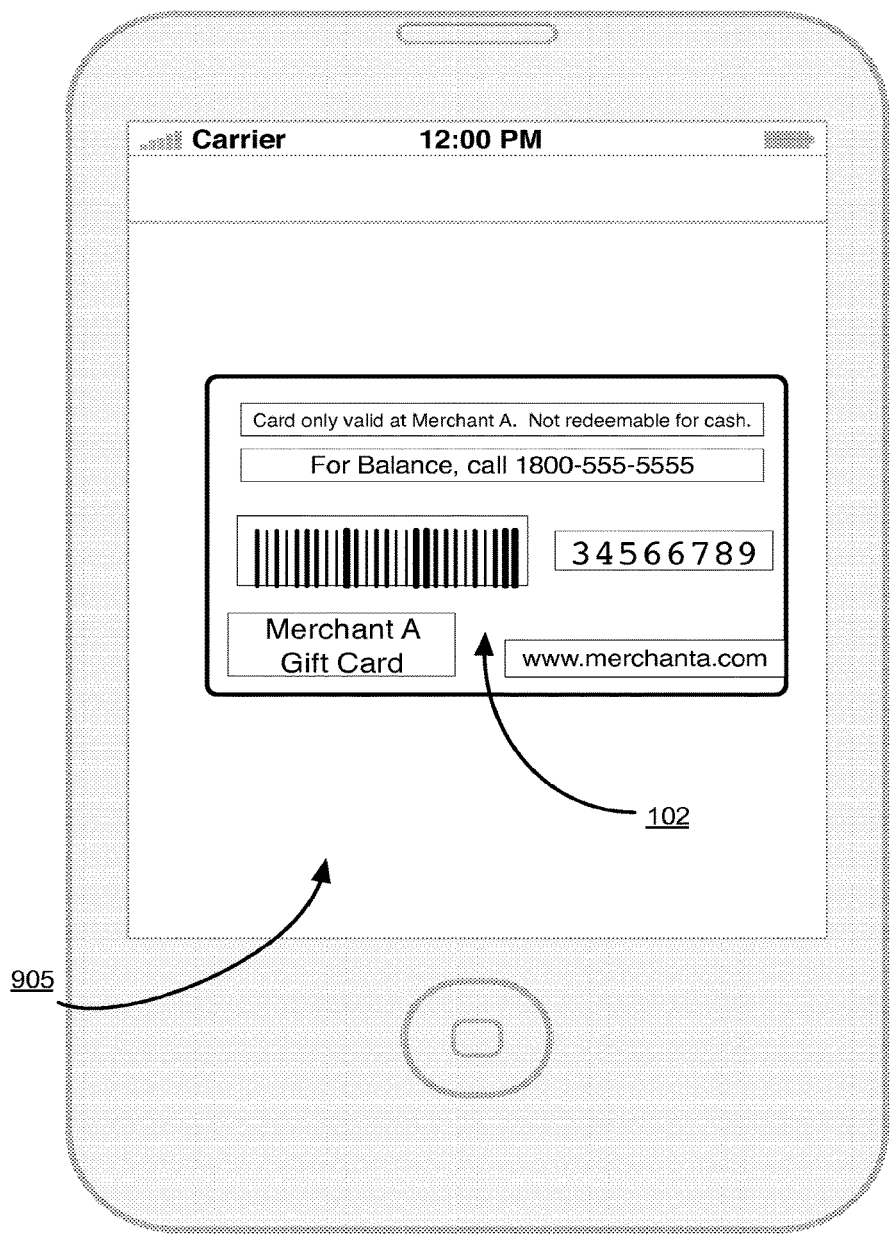
FIG. 6 is an illustration of a user computing device displaying an image of a gift card, in accordance with certain example embodiments.

FIG. 6 is an illustration of a user computing device 110 displaying an image of a gift card, in accordance with certain example embodiments. The user computing device 110 is shown as a mobile smartphone. The user computing device 110 is shown with a display screen 905 as a user interface. The card 102 is shown displayed on the user computing device 110. The example card 102 is a gift card displaying information such as a merchant name, a merchant website address, a barcode, a redemption code, and other information.

Returning to FIG. 2, in block 210, the OCR application 115 isolates the image of the card and transmits the image to the OCR system application module 124. The image may be transmitted via an Internet connection over the Internet, via email, via text, or any other suitable technology. Any image data manipulation or image extraction may be used to isolate the card image. For example, the OCR application 115, the camera 114 module, or the user computing device 110, or other computing device performs blur detection on the image. The image may be recognized as blurry, overly bright, overly dark, or otherwise obscured in a manner that prevents a high resolution image from being obtained. The OCR application 115, or other computing device, may adjust the image capturing method to reduce the blur in the image. For example, the OCR application 115 may direct the camera 114 to adjust the focus on the financial card. In another example, the OCR application 115 may direct the user 101 to move the camera 114 closer to, or farther away from, the card 102. In another example, the OCR application 115 may perform a digital image manipulation to remove the blur. Any other suitable method of correcting a blurred, or otherwise obscured, image may be utilized.

The OCR system application module 124 may crop the image to display only the desired information from the card 102. For example, if the card 102 in the image is a credit card, the OCR system application module 124 accesses information associated with the expected location of the account number of a credit card. The expected location may be obtained from a database of card layouts stored on the system computing device 124 or in another suitable location. Credit cards, driver's licenses, loyalty cards, and other cards typically meet an industry standard for the data locations and the layout of the card. The industry standards may be stored in the OCR system application module 124 or in a location accessible by the OCR system application module 124. In certain circumstances, the data locations may be provided by the issuer 170 of the card 102.

In block 215, the OCR system application module 124 extracts relevant data from the card image. The OCR system application module 124 performs an OCR algorithm on the card image. In the example embodiment, the OCR algorithm is performed by the OCR system application module 124. In another example, the OCR system application module 124 transmits the image to another suitable computing device for performing the OCR algorithm.

The OCR system application module 124 may use any suitable algorithm, process, method, or other manner of recognizing data in the card images. The OCR algorithm may represent any suitable process, program, method, or other manner of recognizing the digits or characters represented on the card image.

In block 220, the OCR system application module 124 extracts relevant data from the card image. The OCR system application module 124 extracts text, characters, numbers, letters, logos, or other data from the card image.

Additionally the OCR system application module 124 extracts data from machine-readable codes, such as barcodes and QR codes. In the examples herein, all machine-readable codes will be represented by the term "barcode." The data in the barcode may be extractable by any machine reading process or algorithm. For example, the height, width, shape, or other characteristics of the barcode and the barcode lines are identified and decoded by the OCR system application module 124.

In an example embodiment, the OCR system application module 124 identifies specific data in the extracted text, such as a redemption code or a user account identifier. These and other desired identifiers and codes are referred to herein as "identification codes."

In block 225, the OCR system application module 124 identifies matching data groups in a comparison of an extracted identification code to extracted barcode data. Block 225 is described in greater detail in the method 225 of FIG. 7.

Figure 7:
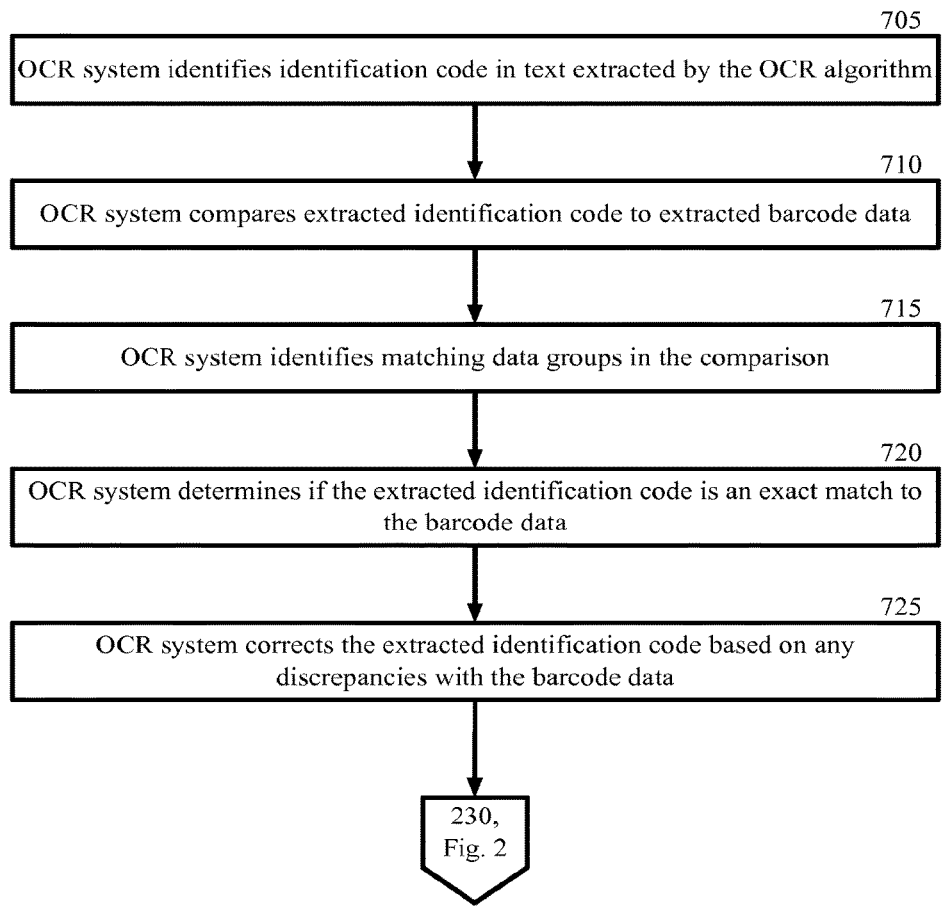
FIG. 7 is a block flow diagram depicting methods for identifying matching data groups in a comparison of an extracted identification code to extracted barcode data, in accordance with certain example embodiments.

FIG. 7 is a block flow diagram depicting methods 225 for identifying matching data groups in a comparison of an extracted identification code to extracted barcode data, in accordance with certain example embodiments. The term "identification code" represents any desired series of characters from the card image. For example, the identification code may represent a user account number, a redemption code, a user identification number, a license number, an expiration date, or any other suitable code.

In block 705, the OCR system application module 124 identifies the identification code in the text extracted by the OCR algorithm. The identification code may be identified based on the location of the identification code in the image, based on the section of text comprising the appropriate number of digits as the identification code, or based on any suitable method of identifying the identification code. The OCR system application module 124 may analyze the extracted text and identify the identification code from the text.

In block 710, the OCR system application module 124 compares the extracted identification code to extracted barcode data. Data extracted from a barcode is typically more accurate than data extracted from alphanumeric characters. The OCR system application module 124 identifies an expected identification code in the extracted text and determines the alphanumeric text of the identification code. For example, the OCR system application module 124 identifies a series of extracted characters that follow a pattern of sixteen digits divided into groups of four. As this configuration matches a particular account identification being sought, then the OCR system application module 124 identifies this sixteen digit series as the account identification code. The OCR system application module 124 converts the data in the barcode to a series of alphanumeric characters to allow the comparison to the extracted text.

In block 715, the OCR system application module 124 identifies matching data groups in the comparison. The OCR system application module 124 employs a matching algorithm to isolate the identification code within the barcode data. For example, the OCR system application module 124 searches for a series of characters in the extracted identification code and the extracted barcode data that match or nearly match.

In the example, if a series of four characters match, then the OCR system application module 124 may identify the location of the matching identification codes in the extracted text and the extracted barcode data. For example, if the first four characters of the identification codes in the extracted text are 0123, and four digits within the barcode data are identified as 0123, then the identification code location in the barcode data may be identified as a 16 digits series beginning with the identified 0123. The matching of the numbers allows the OCR system application module 124 to determine which of the barcode digits or characters correspond to the desired data.

In block 720, the OCR system application module 124 determines if the extracted identification code is an exact match to the barcode data. The OCR system application module 124 matches the data groups to identify the identification number or any other suitable number or series of characters that are located in the barcode. With the location of the barcode number identified, the OCR system application module 124 is able to correct any errors in the OCR algorithm results.

In an example, a sixteen digit alphanumeric identification code for a gift card may be extracted and compared to a thirty digit code extracted from the barcode. The OCR system may employ a matching algorithm to identify a sixteen digit series embedded in the thirty digit code from the barcode that matches the identification code. In the example, the sixteen digit identification code is the following series of numbers:

0000 0000 0000 0010

In the example, the barcode data produced the following series of numbers:

11 2222 3333 4444 0000 0000 0000 0070

The identification code may be identified based on the matching algorithm as the last 16 digits of the barcode. Even though the numbers are not identical, the matching algorithm may determine that the digits of the extracted text and the last 16 digits of the barcode are likely to be representative of the same identification code. The determination may be based on the fact that fifteen of the sixteen digits match. If fifteen out of sixteen matching numbers is over a configured threshold of matching numbers, then the identification code is identified in the barcode data. In the example, 90% of the numbers must match, and 15 out of 16 is greater than a 90% match. The threshold may be based on a certain percentage of matching numbers or a total number of matching numbers. The threshold may be further based on the confidence level that the OCR algorithm produced in the result of the unmatched digit or of the matched digits. For example, if the OCR algorithm produced a low confidence that the unmatched digit was correct, then the OCR system application module 124 may be more likely to consider the digits from the barcode to be a match.

In block 735, the OCR system application module 124 corrects the extracted identification code based on any discrepancies with the barcode data. As the barcode is typically more accurate than extracted text, the barcode data is considered to be the correct number when a discrepancy exists between the extracted text and the barcode data. The OCR system application module 124 changes the stored identification code that was extracted with the OCR algorithm to exactly match the extracted barcode data. The corrected identification code is stored.

Thus, in the example, the identification code for the card is corrected to read:

0000 0000 0000 0070

From block 725, the method 225 proceeds to block 230 of FIG. 2.

Returning to FIG. 2, in block 230, the OCR system application module 124 supplies the extracted data to a digital wallet account on the OCR system application module 124, a digital wallet application module 111, a point of sale terminal, a payment processing system 140, a website, or any suitable application or system that the user 101 desires. The extracted data may be used by an application on the user computing device 110. The extracted data may be transmitted via an Internet connection over the network 105, via a near field communication ("NFC") technology, emailed, texted, or transmitted in any suitable manner.

Figure 3:
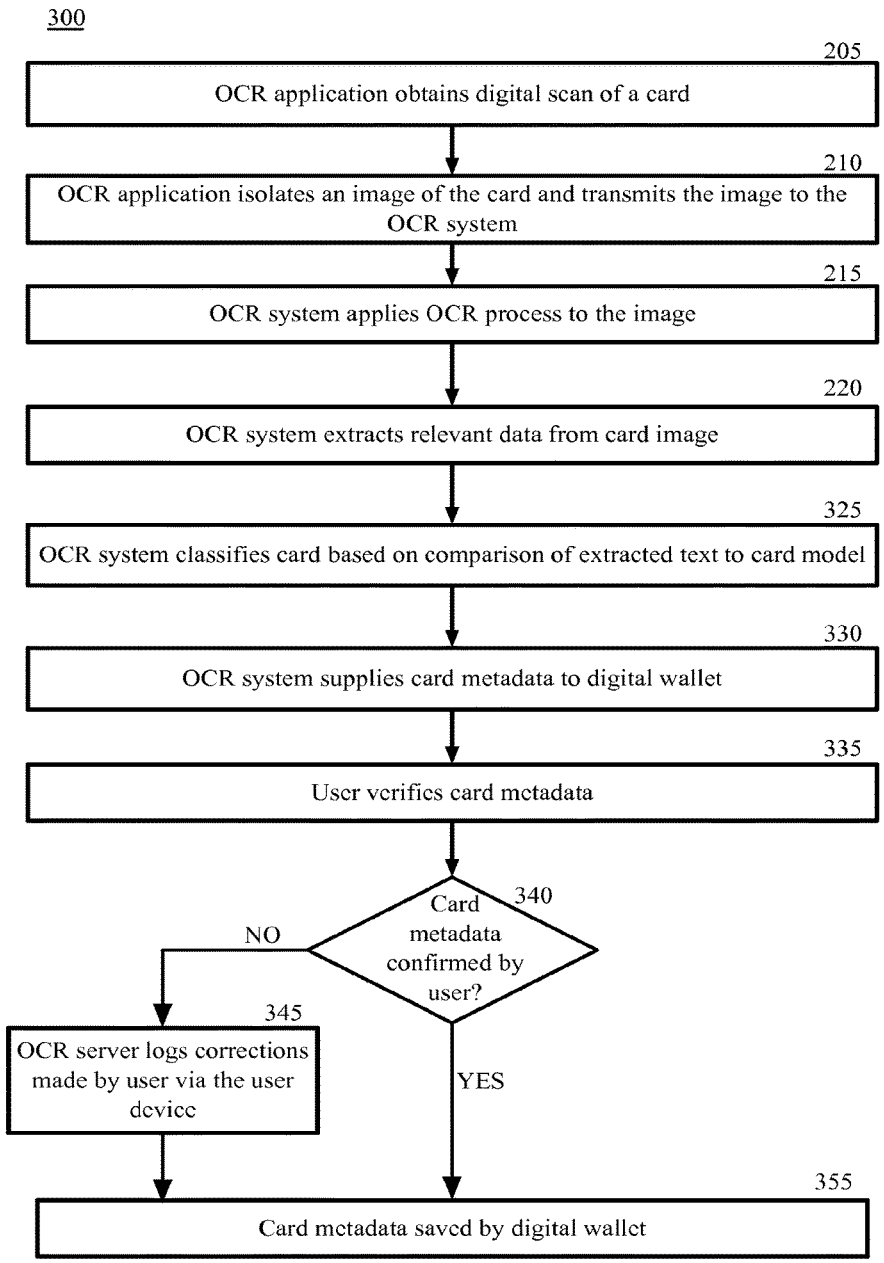
FIG. 3 is a block flow diagram depicting methods for using classifier models to provide card metadata, in accordance with certain example embodiments.

FIG. 3 is a block flow diagram depicting methods 300 for using classifier models to provide card metadata, in accordance with certain example embodiments.

In FIG. 3, blocks 205 through 220 are performed in a substantially similar manner as blocks 205 through 220 of FIG. 2.

In block 325, the OCR system application module 124 classifies a card 102 based on a comparison of extracted text to a card model. The OCR system application module 124 compares the extracted data to a card metadata model to classify the card type. The database or model of card metadata model may be a database or other application that stores card metadata for one or more card types associated with one or more merchant systems, card issuers, or other entities. The card metadata may comprise merchant system names, issuer names, phone numbers, addresses, websites, formats, or other suitable data. In certain embodiments, other data extracted from the card image may be used, such as images, pictures logos, or other suitable data. The model may be used to predict other forms of data relating to the card based on an identification of the model that is associated with the card.

When the OCR system application module 124 extracts data from a card image, the extracted data is compared to the model database. The data from the card image is classified based on matches between the extracted data and the card models. For example, if the extracted data comprises a specific merchant system name, then the model with that name may be identified as an appropriate model for the card. For example, the OCR system application module 124 may extract, from the model, a merchant system address or a merchant system website address.

When a card model classifies the card data, the card model that is associated with the classification is associated with the card image. Card meta data from the card model is associated with the card image.

In block 330, the OCR system application module 124 supplies card metadata from the matching card model in the database to a digital wallet account. In an example, the metadata from the card model may be used to autofill a form that is being used to add the card to the digital wallet application module of the user. Autofilling a form includes any process or method to populate data entry requirements on a form with expected information based on stored information without requiring an input from a user. The form may be autofilled with the data that is extracted from the card image, the supplied card metadata, or a combination of both the data that is extracted from the card image and the supplied card metadata. Other data associated with the user 101, the user account, the merchant system, or other entities may be used to autofill the form.

In another example, the card metadata is transmitted to a digital wallet application module 111 on the user computing device 110. The data may be displayed to the user 101, used to autofill a form, or for any suitable purpose. The card metadata may be transmitted to a digital wallet account on the OCR system application module 124 for storage with the card 102 in the user account. Any other suitable action may be taken with the card metadata.

In block 330, the user 101 verifies the card metadata. For example, the user 101 may analyze the autofilled entries in a form displayed on the user interface via the digital wallet application module 111 or other application on the user computing device 110. The user 101 compares the metadata or the autofilled data with known data or data to which the user 101 has access from the physical card, from the card image, from a third party location, such as a website, or any other suitable data source.

In certain embodiments, the user 101 does not agree with the metadata supplied by the OCR system application module 124. In certain examples, the user 101 corrects the supplied or autofilled data. That is, the data that was inserted into a data field of the form is either incorrect or not the preferred entry for the user 101. In the example, the user 101 manually alters the data in one or more incorrect fields. The user 101 saves the corrected data and registers the card 102 or performs any other suitable action with the card data. In an example, the user 101 changes the phone number for a merchant system associated with a card 102 from the supplied number to an alternate number. The user 101 may make the changes to the data by entering the change via a user interface on the user computing device 110 in the digital wallet application module 111 or any suitable application. The user 101 may make the changes to the data by entering the change via an Internet connection with the user account on the payment processing system 140.

In block 340, the OCR system application module 124 determines if changes to the card metadata have been made by the user 101. The OCR system application module 124 may determine if changes have been made by receiving a notification from the digital wallet application module 111 of data that has been changed by the user 101. In another example, the payment processing system 140 may notify the OCR system application module 124 of the changes. In another example, another application on the user computing device 110 may monitor the changes and provide the notification to the OCR system application module 124. Any other suitable method may be utilized by the OCR system application module 124 to determine if changes have been made.

If changes have been made, then the method 300 proceeds to block 345. If changes have not been made, then the method 300 proceeds to block 350.

In block 345, upon a determination that the user 101 changed the card metadata, the OCR system application module 124 logs the corrections made by the user 101. The OCR system application module 124 may log the change by the user 101 as the change is made in the user account on the OCR system application module 124. The OCR system application module 124 may receive the change when the digital wallet application module 111 connects to the OCR system application module 124 to provide a communication. The OCR system application module 124 may receive the change from the payment processing system 140 after the user 101 makes the change on a digital wallet account. The OCR system application module 124 may received a notification of the change from any suitable source.

In block 355, the card metadata is saved by the digital wallet account. In an example embodiment, the user 101 actuates a function on the user computing device 110 to save the data. For example, the user 101 approves the autofilled data in the form for establishing the card 102, and actuates a virtual or physical button that saves the data. The card data may be saved on the user computing device 110, the payment processing system 140, the OCR system application module 124, a POS terminal of a merchant system, a combination of these locations, or on any suitable computing device.

Figure 4:
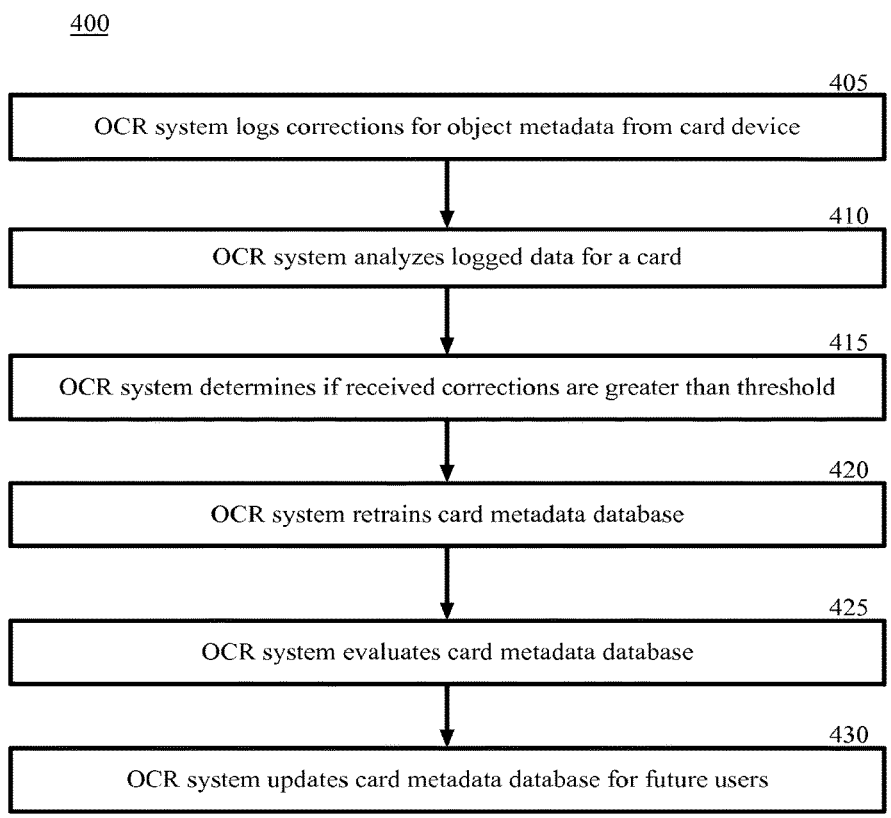
FIG. 4 is a block flow diagram depicting methods for updating a classifier model, in accordance with certain example embodiments.

FIG. 4 is a block flow diagram depicting methods 400 for updating a classifier model, in accordance with certain example embodiments.

In block 405, the OCR system application module 124 logs corrections for card metadata from the user computing device 110 and/or other user devices from one or more other users. As described in block 345 of FIG. 4, the OCR system application module 124 receives notifications when a user 101 corrects metadata supplied by the OCR system application module 124.

In block 410, the OCR system application module 124 analyzes the logged data for a particular card 102. The OCR system application module 124 may periodically or continually note corrections, log the number of corrections, log the content being corrected, log the revised data that is used, and note when the corrections correlate to corrections from other users.

In block 415, the OCR system application module 124 determines if received corrections are greater than a preconfigured threshold number of corrections. In an example, the OCR system application module 124 determines that 20 users have changed the phone number for a merchant system associated with a card 102 from the provided number to an alternate number. The OCR system application module 124 determines that either the provided number was incorrect or that the merchant system has changed the phone number. The OCR system application module 124 updates the metadata model associated with the merchant system to reflect the changed model.

The threshold number of user corrections required before the OCR system application module 124 takes action may be configured by an operator on the OCR system application module 124, by an algorithm devised to minimize the incorrect data, or by any suitable system, person, program, or other party. In certain embodiments, the OCR system application module 124 may take action after as few as one correction. In certain embodiments, the action taken by the OCR system application module 124 may only be to monitor future interactions associated with the corrected card 102. In certain embodiments, the action taken by the OCR system application module 124 may be to suspend the card model until correct data is determined by a third party, such as OCR system application module 124 operator.

In block 420, the OCR system application module 124 retrains the card metadata database. When the OCR system application module 124 determines that an amount of corrections over the threshold have occurred, the OCR system application module 124 retrains the card metadata database such that future data sent with a particular card model will comprise the updated data. In the previous example, the OCR system application module 124 updates the phone number of the merchant system to reflect the new phone number.

In block 425, the OCR system application module 124 evaluates the card metadata database. The OCR system application module 124 may evaluate the updated card models on the database by providing the updated metadata to subsequent users when subsequent users are presented with metadata based on OCR of an image of a similar card 102 to determine if the subsequent users correct the data. In another example, an operator of the OCR system application module 124 compares the updated data to a third party source. For example, the operator of the OCR system application module 124 may compare the updated data to the data displayed on a website of the merchant system.

In block 430, the OCR system application module 124 updates the card metadata database for future users 102. The updated card metadata database may provide the updated phone number to subsequent users 102.

Figure 5:
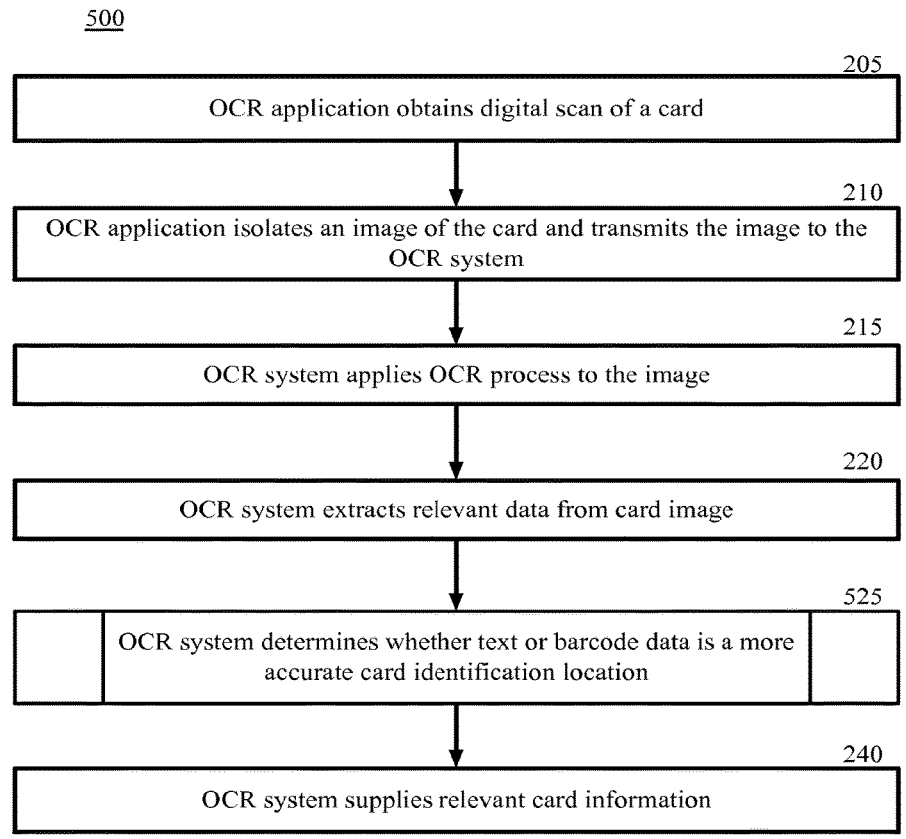
FIG. 5 is a block flow diagram depicting methods for extracting card data using a determined card type, in accordance with certain example embodiments.

FIG. 5 is a block flow diagram depicting methods 500 for extracting card data using a determined card type, in accordance with certain example embodiments.

Blocks 205 through 220 are substantially similar to blocks 205 through 220 of FIG. 2.

Figure 8:
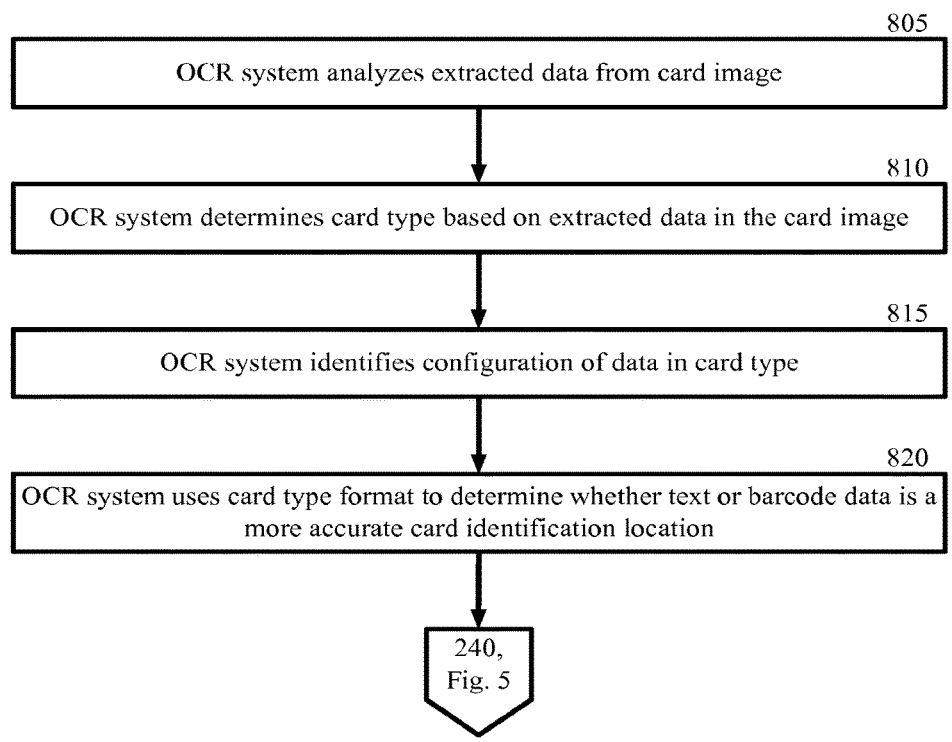
FIG. 8 is a block flow diagram depicting methods for determining whether text or barcode data is a more accurate card identification location, in accordance with certain example embodiments.

Block 525 is described in greater detail in the method 525 of FIG. 8.

FIG. 8 is a block flow diagram depicting methods for determining whether text or barcode data is a more accurate card identification location, in accordance with certain example embodiments.

In block 805, the OCR system application module 124 analyzes the extracted data from the card image. The OCR system application module 124 analyzes the extracted text from a card image and identifies details related to the card 102 based on identified factors. The factors may be a recognized merchant system name, a recognized issuer name, a recognized format, a recognized identification number sequence, a recognized logo, a recognized color scheme, a recognized phone number, or any other suitable factor. In an example, the OCR system application module 124 may identify text on the card image that matches a name of a merchant system in the database. The analysis is used by the OCR system application module 124 to identify, from a comparison with a database, the name of a particular bank, merchant system, card issuer, or any suitable institution.

In an example, the OCR system application module 124 may identify the card image as likely being a debit card associated with the particular merchant system based on an identification of the merchant system and the word "debit" on the card.

In block 810, the OCR system application module 124 determines a card type based on detected data in the card image. When the OCR system application module 124 identifies one or more factors from the card image as matching factors stored in a database on the OCR system 120, the OCR system application module 124 identifies the card type based on data associated with the matched factors. The card type may be a general type for a debit card, a gift card, or other card type. The card type may be a format for a specific merchant system or issuer. The card type may be for a standard card format for an identification card or an entry ticket. The card type may be any known card format or other standard for a group of issued cards.

In the previous example, a debit card associated with a particular merchant system is identified. The OCR system application module 124 accesses information about the card type associated with the debit card associated with the particular merchant system from a database of card types. The database may be stored on the OCR system 124, stored by a remote system, stored in a cloud computing environment, or stored in any suitable location.

In block 815, the OCR system application module 124 identifies a configuration of data in the card type. Knowledge of the card type allows the OCR system application module 124 to access information about the card 102, such as the format of the identification number, the location of data on the card, the format of a barcode, and other suitable information. As the card type may be associated with a format for the data displayed on the card, the OCR system application module 124 is able to accurately identify required data in a specified location. The configuration of the data in the card type may be stored on the database of card types. The OCR system application module 124 accesses the configuration from the database based on the knowledge of the card type.

In block 820, the OCR system application module 124 uses the card type format to determine the most accurate card identification location. The known format of a card 102 allows the data extraction to be performed more accurately based on known extraction techniques and the accuracy of the techniques. For example, OCR algorithms of an image may have an accuracy of 80% based on industry standards while barcode extraction may have an accuracy of 98% based on industry standards. The OCR system application module 124 compares the locations of required information and determines the location that is most accurate. Some locations may be more accurate, easier to obtain, or in any manner more advantageous than another location. For example, if a number is represented in a barcode and in human-readable text on the card, the barcode may provide a more accurate data extraction.

In an example, if the OCR system application module 124 determines that the card 102 has a format wherein a redemption code for a gift card is a 16 digit code at the end of the string of characters represented on the barcode, then the OCR system application module 124 will be able to easily and accurately extract the redemption code. In certain examples, the OCR system application module 124 determines that the card 102 has a format wherein a redemption code for a gift card is represented in the barcode and also in human-readable text on the card. The OCR system application module 124 may identify information that specifies which location provides the most accurate results.

In another example, the OCR system application module 124 may identify a checksum rule for the account number on a card. If the OCR system application module 124 extracts an account number, the OCR system application module 124 may then apply the appropriate checksum algorithm to verify the account number of the card 102.

In alternate embodiments, the OCR system application module 124 may be customized to look for characters in particular locations on the card image based on the card type. The OCR system application module 124 may be customized to look for a certain number of characters. The OCR system application module 124 may be customized to look for certain combinations of characters. The OCR system application module 124 may be customized to know that the cards 102 from the particular credit card company typically have certain data on the reverse side of the card. The OCR system may be customized to know which characters are typically embossed. The OCR system may be customized to look for any configured arrangements, data locations, limitations, card types, character configurations, or other suitable card data.

From block 820, the method 525 proceeds to block 240 in FIG. 5. Block 240 is substantially similar to block 240 as described previously with respect to FIG. 2.

Other Example Embodiments

Figure 9:
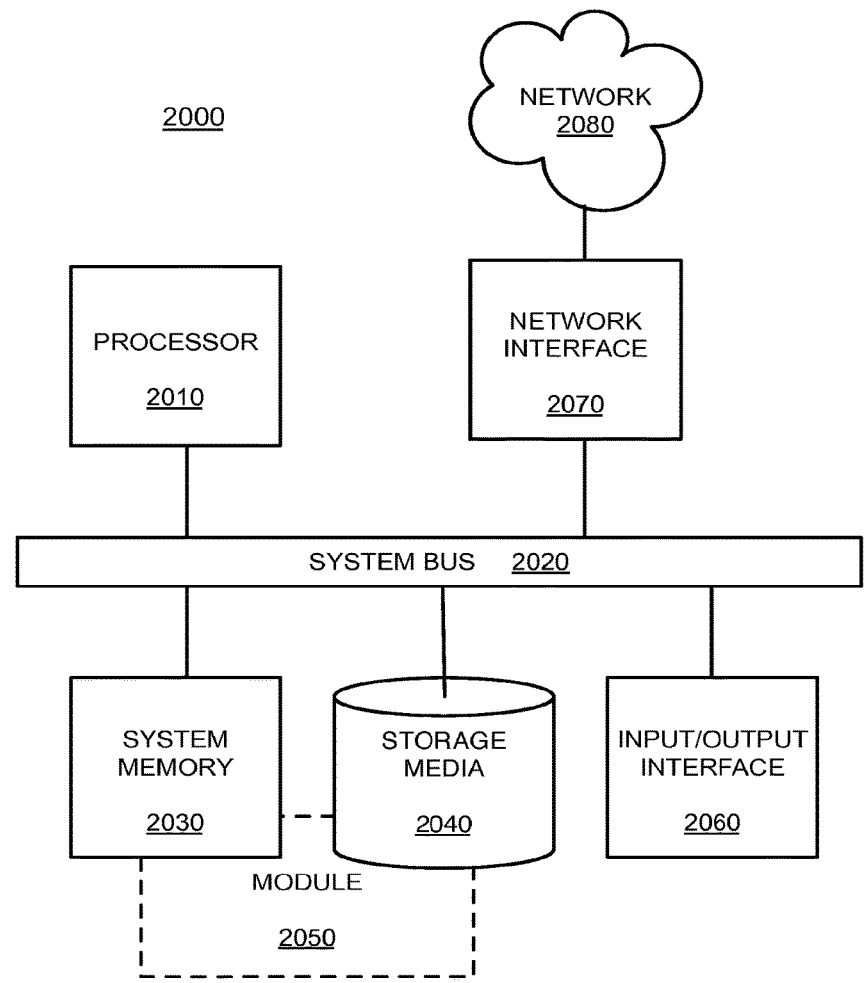
FIG. 9 is a block diagram depicting a computing machine and a module, in accordance with certain example embodiments.

FIG. 9 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain example embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to extract information from objects, comprising:
   extracting, by one or more computing devices, a series of extracted characters on a digital representation of an object using an optical character recognition process;
   performing, by the one or more computing devices, a data recognition process on a machine-readable code on the digital representation of the object;
   comparing, by the one or more computing devices, the series of extracted characters obtained via the optical character recognition process to a series of extracted characters from the data extracted from the machine-readable code via the data recognition process;
   determining, by the one or more computing devices, that the series of characters determined via the optical character recognition process performed on the digital representation of the object and the series of characters extracted from the data extracted from the machine-readable code comprise one or more discrepancies;
   upon a determination that one or more discrepancies between the series of characters determined via the optical character recognition process and the data extracted from the machine-readable code exists, correcting, by the one or more computing devices, the series of characters determined via the optical character recognition process performed on the digital representation of the object based on the particular series of characters extracted from the machine-readable code; and
   communicating, by the one or more computing devices and to a user computing device, the corrected series of characters and instructions to display the corrected series of characters via the user computing device.

2. The method of claim 1, wherein the series of extracted alphanumeric characters and the particular series of characters extracted from the data extracted from the machine-readable code are determined to match based on an identification, by the one or more computing devices, of at least a threshold number of matching characters between the extracted alphanumeric characters and the particular series of characters extracted from the data extracted from the machine-readable code.

3. The method of claim 2, wherein the threshold is based on a percentage of the characters matching.

4. The method of claim 1, further comprising determining, by the one or more computing devices, a match between the series of characters determined via the optical character recognition process performed on the digital representation of the card to the particular series of characters extracted from the data extracted from the machine-readable code, wherein the series of extracted characters obtained via the optical character recognition process is compared to the series of extracted characters from the data extracted from the machine-readable code via the data recognition process in response to determining the match.

5. The method of claim 1, wherein the machine-readable code comprises a barcode.

6. The method of claim 1, wherein the series of extracted characters comprises an alphanumeric series of characters comprising an identification code for an account of a user.

7. The method of claim 6, wherein the series of extracted characters comprises a redemption code of a gift card.

8. A computer program product, comprising:
   a non-transitory computer-readable storage device having computer-readable program instructions embodied thereon that when executed by a computer cause the computer to extract card information, comprising:
   computer-readable program instructions to extract a series of extracted characters on a digital representation of an object using an optical character recognition process;
   computer-readable program instructions to perform a data recognition process on a machine-readable code on the digital representation of the object;
   computer-readable program instructions to compare the series of extracted characters obtained via the optical character recognition process to a series of extracted from the data extracted from the machine-readable code via the data recognition process;
   computer-readable program instructions to determine that the series of characters determined via the optical character recognition process performed on the digital representation of the object and the series of characters extracted from the data extracted from the machine-readable code comprise one or more discrepancies;
   computer-readable program instructions to correct, upon a determination that one or more discrepancies between the series of characters determined via the optical character recognition process and the data extracted from the machine-readable code exists, the series of characters determined via the optical character recognition process performed on the digital representation of the object based on the particular series of characters extracted from the machine-readable code; and
   computer-readable program instructions to communicate, to a user computing device, the corrected series of characters and instructions to display the corrected series of characters via the user computing device.

9. The computer program product of claim 8, wherein the series of extracted characters and the particular series of characters extracted from the data extracted from the machine-readable code are determined to match based on computer-readable program instructions to identify at least a threshold number of matching characters between the extracted alphanumeric characters and the particular series of characters extracted from the data extracted from the machine-readable code.

10. The computer program product of claim 9, wherein the threshold is based on a percentage of the characters matching.

11. The computer program product of claim 8, further comprising computer-readable program instructions to determine a match between the series of characters determined via the optical character recognition process performed on the digital representation of the card to the particular series of characters extracted from the data extracted from the machine-readable code, wherein the series of extracted characters obtained via the optical character recognition process is compared to the series of extracted characters from the data extracted from the machine-readable code via the data recognition process in response to determining the match.

12. The computer program product of claim 8, wherein the machine-readable code comprises a barcode.

13. The computer program product of claim 8, wherein the series of characters comprises a series of alphanumeric characters comprising an identification code for an account of a user.

14. The computer program product of claim 8, wherein the alphanumeric series of characters comprises a redemption code of a gift card.

15. A system to extract card information, comprising:
a storage device; and
a processor communicatively coupled to the storage device, wherein the processor executes application code instructions that are stored in the storage device to cause the system to:
extract a series of extracted characters on a digital representation of an object using an optical character recognition process;
perform a data recognition process on a machine-readable code on the digital representation of the object;
compare the series of extracted characters obtained via the optical character recognition process to a series of extracted from the data extracted from the machine-readable code via the data recognition process;
determine that the series of characters determined via the optical character recognition process performed on the digital representation of the object and the series of characters extracted from the data extracted from the machine-readable code comprise one or more discrepancies;
correct, upon a determination that one or more discrepancies between the series of characters determined via the optical character recognition process and the data extracted from the machine-readable code exists, the series of characters determined via the optical character recognition process performed on the digital representation of the object based on the particular series of characters extracted from the machine-readable code; and
communicate, to a user computing device, the corrected series of characters and instructions to display the corrected series of characters via the user computing device.

16. The system of claim 15, wherein the series of extracted alphanumeric characters and the particular series of characters extracted from the data extracted from the machine-readable code are determined to match based on identifying at least a threshold number of matching characters between the extracted alphanumeric characters and the particular series of characters extracted from the data extracted from the machine-readable code.

17. The system of claim 15, wherein the processor is further configured to execute application code instructions that are stored in the storage device to cause the system to determine a match between the series of characters determined via the optical character recognition process performed on the digital representation of the card to the particular series of characters extracted from the data extracted from the machine-readable code, wherein the series of extracted characters obtained via the optical character recognition process is compared to the series of extracted characters from the data extracted from the machine-readable code via the data recognition process in response to determining the match.

18. The system of claim 15, wherein the machine-readable code comprises a barcode.

19. The system of claim 15, wherein the series of characters comprises an alphanumeric series of characters comprising an identification code for an account of a user.

20. The system of claim 19, wherein the alphanumeric series of characters comprises a redemption code of a gift card.

* * * * *